United States Patent
Takaoka et al.

[19]

[11] Patent Number: 6,063,472
[45] Date of Patent: May 16, 2000

[54] ARCHITECTURAL MATERIAL AND A PROCESS OF PRODUCTION THEREOF

[75] Inventors: Toshihiro Takaoka; Yoshihiro Sakai; Tadashi Fujimoto, all of Tokuyama, Japan

[73] Assignee: Tokuyama Corporation, Yamaguchi-ken, Japan

[21] Appl. No.: 09/011,994

[22] PCT Filed: Jul. 10, 1997

[86] PCT No.: PCT/JP97/02384

§ 371 Date: Mar. 9, 1998

§ 102(e) Date: Mar. 9, 1998

[87] PCT Pub. No.: WO98/01296

PCT Pub. Date: Jan. 15, 1998

[30] Foreign Application Priority Data

Jul. 10, 1996 [JP] Japan .................................... 8-180965
Sep. 20, 1996 [JP] Japan .................................... 8-250362
Oct. 30, 1996 [JP] Japan .................................... 8-288276

[51] Int. Cl.$^7$ .................................................. B32B 9/00
[52] U.S. Cl. .............................. 428/70; 428/703; 156/42; 156/45
[58] Field of Search .................................. 156/39, 42, 45; 428/70, 703

[56] References Cited

U.S. PATENT DOCUMENTS 3,694,298  9/1972  Veschuroff ................................ 428/70
4,394,411  7/1983  Krull ......................................... 428/70
5,763,090  6/1998  Boe .......................................... 428/70

OTHER PUBLICATIONS

Abstact of Japanese Laid–Open Patent Application Publication No. 08–72195 (Mar. 19, 1996).
Abstract of Japanese Laid–Open Patent Application Publication No. 08–244159 (Sep. 24, 1996).

*Primary Examiner*—Timothy M. Speer

[57] ABSTRACT

The present invention provides an architectural material obtained by forming a decorative layer containing calcium carbonate as a binder component on the surface of a base material, and laminating a ventilating protective sheet having a peeling strength of 200 to 4000 mN on the surface of the decorative layer without interposing an adhesive layer separately, and a process for producing the architectural material. The architectural material has excellent soiling resistance or abrasion resistance, and is highly practical.

11 Claims, 2 Drawing Sheets

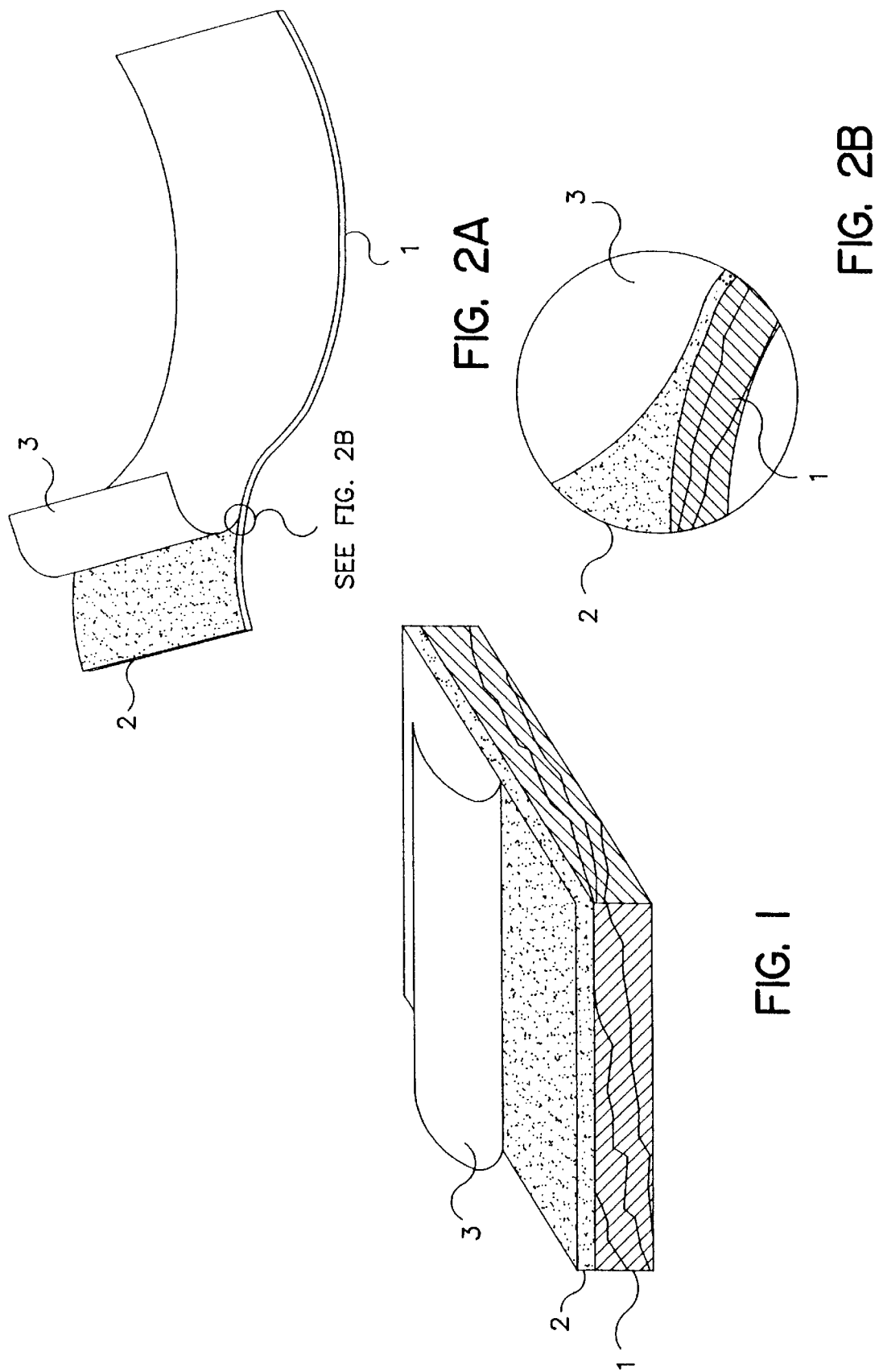

ARCHITECTURAL MATERIAL AND A PROCESS OF PRODUCTION THEREOF

TECHNICAL FIELD

The present invention relates to a new architectural material for constructing a wall surface, a pillar surface or a ceiling surface, and more particularly, to an architectural material obtained by laminating a decorative layer containing calcium carbonate as a binder component on the surface of a base material composed of a board or sheet, in which a protective sheet peelable by a suitable force can be adhered on the surface of the decorative layer whose adhesion onto the surface of the sheet is difficult due to the surface property of the decorative layer such as the porous quality of the sheet or its powderization, and the decorative layer can be protected at the time of handling such as transportation and provision, and its practical use can be made.

BACKGROUND TECHNOLOGY

As a finishing material such as a wall surface, a pillar surface or a ceiling surface composed of a calcium silicate board or a gypsum board, wall papers of poly(vinyl chloride) which are easy to apply and have excellent economy have been used widely, but the resulting surface finished by application of wall papers gives poor substantial ventilation. For this reason, the ventilation possessed by the board of the base material is hindered by the wall paper, and this causes dew formation on the surface and brings about the development of molds and the peeling of the wall paper. Furthermore, the wall papers and adhesives used in adhering the wall papers have caused various health hazards.

As a finishing material replacing the wall papers, a wet-type finishing such as stucco and Juraku finish by a plasterer which has ventilation and does not emit noxious substances has been reconsidered. However, since aging is required until the wet-type finishing material is solidified, the term of construction is long, and another problem is that a difference in the ability and experience of the individuals of plasterers is easy to appear. Furthermore, since the number of excellent plasterers is insufficient in recent years, it is impossible to meet the above required demand.

Accordingly, by forming a decorative layer containing calcium carbonate as a main component of stucco on the surface of a board or sheet, the present inventors have developed an architectural material having a design very similar to a plasterer finish of a wet-type finishing material such as stucco or Juraku finish.

For example, the present inventors have provided architectural materials in which a decorative layer containing calcium carbonate as a binding component is formed on the surface of a base material as shown in Japanese Laid-Open Patent Publications Nos. 331831/1995, 244159/1996, 72195/1996 and 41614/1997.

However, the above-mentioned architectural materials develop powderization on the surface of a decorative layer containing calcium carbonate as a binder component formed on the surface of a base layer such as a board or sheet or the surface of the decorative layer has a defect of a low hardness. For this reason, during the transportation of the base material, during a secondary processing, or during the application, the decorative layer is prone to be contaminated or injured, and it has a serious problem in use at a building site.

When the base material is a sheet having flexibility, in addition to the above-problem, the decorative layer is liable to be cracked by bending stress during the transportation, the secondary processing or the application. Such architectural materials are not satisfactory practically.

In order to compensate for the soiling of the decorative layer or the easy injury of the decorative layer, it is considered to protect the surface of a decorative layer of the architectural material, and mount a protective sheet which can be removed easily by a suitable force after application. For example, in a wooden board on which a resin decorative layer is provided on the surface, or in a stainless steel plate in which the surface is mirror-finished, it is known that in order to protect its surface, a protective sheet composed of a sticky sheet is provided.

However, since the surface of the decorative layer containing calcium carbonate as a binder component possesses a powderization portion or has a porous portion, it is difficult to laminate a protective sheet by its intimate adhering force alone with a sufficient peeling strength.

When a strong adhesive agent is used in order to increase the peeling strength with the decorative layer, the peeling adhesion strength of the protective sheet is not stable for the above reason, and if there is a portion having too strong a part, the decorative layer may be damaged when the protective sheet is peeled off, and the sticking agent comes into the pores of the decorative layer and the sticking agent is transferred to the decorative layer and remains there.

DISCLOSURE OF THE INVENTION

Therefore, it is a first object of the present invention to provide an architectural material having excellent soil preventing effect and abrasion resistance which is obtained by laminating a protective sheet having a suitable peeling strength on the surface of a decorative layer containing calcium carbonate as a binder component formed on the surface of a board or sheet without using an adhesive agent separately on the surface of the decorative layer.

It is a second object of the present invention to provide an architectural material having an increased practicability together with the effect of the above protective sheet, said architectural material containing calcium carbonate as a binder component on the decorative layer having increased surface hardnes.

It is a third object of the present invention to provide a method of producing the above architectural material with good reproducibility and easily.

Other objects and advantages of the present invention will become apparent from the foregoing description.

According to the present invention, the first object of the present invention can be achieved by an architectural material prepared by forming a decorative layer containing calcium carbonate as a binder component on the surface of a base material and laminating a ventilating protective sheet having a peel strength of 200 to 4000 mN on the surface of the decorative layer without providing an adhesive layer separately.

The second object of the present invention can be achieved by an architectural material in which the decorative layer has a surface hardness, determined by a 45° pencil hardness, of B or above.

The third object of the present invention can be achieved by a method of producing an architectural material which comprises laminating a layer composed of a kneaded mixture of calcium hydroxide and water and a ventilating protective sheet successively on the surface of a base material, and carbonating the calcium hydroxide to cure it.

SIMPLE DESCRIPTION OF DRAWINGS

FIG. 1 is an outline view showing one embodiment in which an architectural material of the present invention is a board.

FIG. 2 is an outline view showing one embodiment in which an architectural material of the present invention is a sheet.

Figure 3:
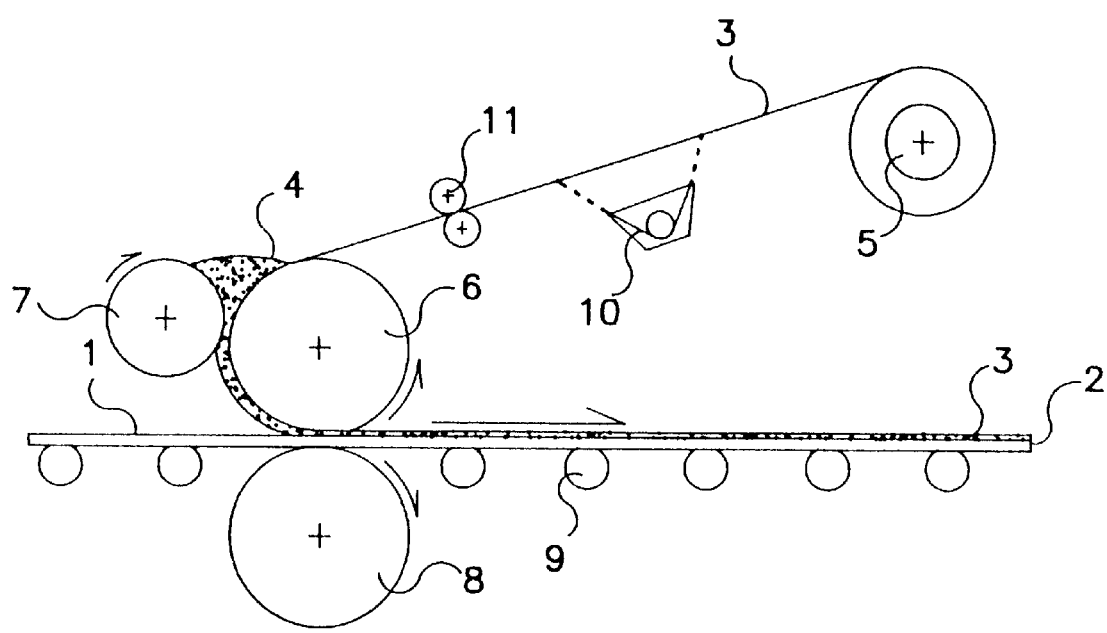
FIG. 3 is an outline view of a typical embodiment of an apparatus used to produce an architectural material of the present invention.

In the above drawings, the symbols represent the following parts.
1. a base material
2. a decorative layer
3. a ventilating protective sheet
4. a kneaded mixture
5. a take-up roll for the ventilating protective sheet
6. a support roll for the ventilating protective sheet
7. a spreading roll
8. a board-supporting roll
9. a conveyor
10. a heating apparatus
11. a pinch roller

DETAILED DESCRIPTION

In the present invention, the form of the base material may generally include a board and a sheet.

As the board, a plate-like body on which a decorative layer containing calcium carbonate as a binder component can be formed, may be used without any limitation. Especially, the above-mentioned plate-like body preferably having ventilation property (to be referred to as a ventilating board) is preferred.

Examples of the preferred boad include a gypsum board, a calcium silicate board, an asbestos cement calcium silicate board, a slug cement board, a wood wool cement plate, a hollow cement plate, a foamed cement plate and a wooden plywood.

The above boards, for example a gypsum board, may be handled in a state where a sheet such as a waterproof sheet is present on the surface, but in the present invention, such a state of board is used.

The sheet may be one on the surface of which a decorative layer containing calcium carbonate as a binder component is formed. Under the producing conditions mentioned below, a solid content in the kneaded mixture should not permeate through the sheet. Such a sheet may be used without any limitation.

Preferred sheets include a base paper for a gypsum board, a waterproof paper such as a paraffin-coated paper, and a woven cloth or a nonwoven cloth composed of fibers such as glass fibers, vinylon fibers, polypropylene fibers, polyester fibers, polyethylene terephthalate fibers, acrylic fibers, aramide fibers, and carbon fibers. The base paper for a gypsum board has excellent adhesion to the decorative layer, and since the resulting decorated sheet may be applied by using conventional adhesive agents for wall papers, such decorative sheet is particularly preferred.

The thickness of the sheet is not limited at all. The thickness of the sheet may be 0.1 to 3 mm preferably for handling of architectural materials.

In the present invention, a decorative layer containing calcium carbonate as a binder component contains a calcium carbonate component obtained by reacting a kneaded mixture of calcium hydroxide and water with carbon dioxide to carbonate and cure the calcium hydroxide.

Incidentally, the carbonating reaction of calcium hydroxide rapidly proceeds until the conversion reaches about 50%, and thereafter, the carbonating reaction proceeds slowly. Furthermore, the function of the binder component is carried out effectively at a time when the conversion of the carbonating reaction exceeded about 50%. Hence, calcium carbonate in the decorative layer of the present invention contains calcium carbonate in which the conversion of the carbonation reaction exceeded at least 50%, especially preferably at least 60%.

As calcium hydroxide, commercial slaked lime, stucco and dolomite stucco containing calcium hydroxide as a main component are used without any limitation.

The decorative layer containing calcium carbonate as a binder component is treated with the method of producing an architectural material of the present invention to be described in detail hereinafter to make the surface of the decorative layer elaborate and to increase the hardness of the surface.

Namely, a decorative layer whose surface hardness has a 45° pencil hardness of B or higher is provided in the present invention. By achieving such a hardness, abrasion resistance cooperating with a protective action of a ventilating protective sheet to be laminated thereon is preferred in the present invention.

It is possible to add various additives to the above decorative layer according to the properties required in utilities of the architectural materials of the present invention. Such additives include, for example, aqueous emulsion solids, fibers, inorganic fine aggregates, active fine particles and pigments. The architectural materials may further include compounding agents which may be added preferably for the purpose of production.

Since the solid content of the above aqueous emulsions increases the toughness of the decorative layer, it also increases the adhesion strength between the decorative layer and a ventilating board, and the peel strength between the decorative layer and the ventilating protective sheet to be described in details. Accordingly, by properly compounding such layers, the peeling adhesion strength between the decorative layer and the ventilating protective sheet can be adjusted preferably to a high level.

As the aquous emulsion, an emulsion prepared by dispersing a monomer, an oligomer or a polymer in a aqueous medium may be used without limitation. Specific examples of such an aqueous emulsion may include synthetic polymeric emulsions of arnacrylic resin type, a vinyl acetate type or a styrene/butadiene rubber type. These aqeuous emulsions cause the medium to evaporate and at least a part of the solid content is present in the cured product of calcium carbonate when the cured product of calcium carbonate is formed.

As the above fibers, known fibers which can be incorporated in the decorative layer can be used without any limitation. Specific examples of fibers include glass fibers, vinylon fibers, polypropylene fibers, polyester fibers, polyethylene terephthalate fibers, acrylic fibers, aramide fibers, carbon fibers and metal fibers. The shape of the fibers may be short fibers, long fibers, woven fabrics, non-woven fabrics. Among them, the short fibers are especially effective to increase the toughness and cutting processability of the decorative layer, and are preferably used. The length and diameter of the short fibers are not particularly limited. However, the length may range from 1 mm to 10 mm, especially from 2 mm to 6 mm, and the diameter may range from 5 to 50 μm, especially from 10 to 30 μm. The resulting decorative layer has an increased toughness, and has an excellent cutting processability.

Examples of the inorganic fine aggregates, for example, include calcium carbonate (which does not pertain to a binder component), siliceous sand, Kansui sand, mica, glaze-applied siliceous sand, glaze-applied mica, ceramic sand, glass beads and perlite may having an average particle diameter of 0.03 to 2 mm. When the base material is a sheet, its average particle diameter may preferably be 0.05 to 1.0 mm. When the base material is a sheet not substantially containing a fiber in the decorative layer and the thickness of the decorative layer is 0.1 to 1 mm, the average particle diameter is preferably 0.05 to 0.5 mm. Furthermore, examples of the active finely particles include blast furnace water destroyed slug having an average particle diameter of 0.1 to 50 μm, fly ash and silica fume.

As pigments, those generally used by plasterers which include metal oxides such as iron oxide, titanium oxide and chromium oxide, may having an average particle diameter of 0.5 to 50 μm and various stone powders, are exemplified.

Other additives include organic blending agents such as paraffin, calcium stearate and magnesium stearate; dimethylpolysiloxane, silicone oils and silicone resins containing polysiloxane as a main component which are obtained by substituting a part of the methyl groups of dimethylpolysiloxane by a hydrogen atom, a phenyl group, an alkyl group, a mercapto group, a vinyl group, a cyanoalkyl group, or a fluoroalkyl group; and organoalkoxysilanes such as methyltrimethoxysilane, ethyltrimethoxysilane, dimethyldimethoxysilane, diethyldimethoxysilane, butyltrimethoxysilane, hexyltrimethoxysilane, heptyltri-methoxysilane, octyltrimethoxysilane, dihexyldimethoxysilane, diheptyldimethoxysilane and trihexylmethoxysilane.

The compounding amounts of these additives are not particularly limited. Generally, they are preferably used in % by weight in the decorative layer. These proportions represent values obtained by calculating the total amount of calcium hydroxide carbonated to calcium carbonate.

The amount of the aqueous emulsion added is from 0.5 to 18% by weight, preferably from 2 to 12% by weight, calculated as the solid content of the aqueous emulsion in order to increase the toughness of the resulting decorative layer, the adhesion strength between the decorative layer and the base material, and the peeling strength between the decorative layer and the sheet. When the base material is a sheet, the amount of the aqueous emulsion may be at least 4% by weight in order to increase the flexibility of the resulting architectural material.

The amount of the fibers, for example short fibers, is preferably 0.1 to 5% by weight. When the base material is a sheet and the thickness of the decorative layer is 0.1 to 1 mm, the flexibility of the resulting architectural material can be ensured without substantially adding the fibers.

The amount of the inorganic fine aggregate to be added is 70% by weight or below, preferably 60% by weight or below. The amount of the fine particles added may prefeably be 3% by weight or below. Furthermore, the pigment may be used in an amount of 5% by weight or below without any particular problem.

The organic blending agents, the silicone oils, the silicone resins and the organoalkoxysilanes as the other additives are effective to increase the waterproof property, antifreezing and antifusion properties, chemical resistance and weather resistance of a decorative layer of the resulting architectural material. Usually, the above-mentioned additives are preferably contained in the decorative layer composed of calcium carbonate in an amount of 0.05 to 2% by weight.

In the present invention, when any of the above-mentioned additives is compounded in the decorative layer, the proportion of calcium carbonate acting as a binder (in the same way as above, calculated in the state in which calcium hydroxide is converted to a 100% carbonated condition) is adjusted to at least 10% by weight, preferably at least 25% by weight, more preferably at least 30% by weight desirably to approach the design of the surface of the decorative layer to a stucco finish.

In the present invention, the thickness of the decorative layer containing calcium carbonate as a binder component is not particularly limited, but generally is preferably in the range of 0.1 to 3 mm.

When the base material is a board, it is especially preferred that the thickness of the base material may be 0.8 to 2 mm. Furthermore, when the base material is a sheet, it is preferred that the thickness of the base material may be 0.1 to 2 mm, especially 0.1 to 1 mm. Without substantially includidng a fiber in the decorative layer, the ventilating protective sheet is laminated with the above-mentioned peeling strength to prevent the above problem against flexure.

The greatest characteristic of the architectural material of the present invention is that as shown in FIGS. 1 and 2, the ventilating protective sheet 3 is laminated with a peeling strength of 200 to 4000 mN on the surface of the decorative layer 2 containing calcium carbonate as a binder component, which decorative layer is formed on the surface of the base material 1 without separately interposing an adhesive agent.

As stated above, when the protective sheet is laminated on the decorative layer containing calcium carbonate as a binder component, since the surface of the decorative layer is porous, the protective sheet is difficult to adhere directly. For this reason, when the decorative layer is protected by the ventilating protective sheet, it is necessary to pack the entire architectural material. This requires a great amount of the sheet, and during execution of works, it takes time to remove the packs.

On the other hand, in the architectural material of the present invention, a ventilating protective sheet is used as the protective sheet and is adhered intimately by the method described below whereby the ventilating protective sheet can be laminated with a reeling strength. Accordingly, the architectural material of the present invention in which the ventilating protective sheet is laminated with a moderate peeling strength does not cause the peeling of the ventilating protective sheet during handling and accurately prevents the occurrence of injuries on the surface of the decorative layer. Furthermore, after execution of works, the ventilating protective sheet can be peeled without damaging the decorative layer.

When the peeling strength of the ventilating protective sheet is smaller than 200 mN in the present invention, the sheet is peeled off during handling of the architectural material. Furthermore, when the peeling strength is larger than 4000 mN, the peeling of the sheet becomes difficult, and it is likely that a part of the decorative layer containing calcium carbide as a binder component at the time of peeling.

The peeling strength of the sheet is especially preferably adjusted to 800 to 2500 mN.

The peeling strength in the present invention is a value measured under conditions of 300 mm/minute by using a sample having a width of 25 mm in accordance with the 180° peeling adhesion strength test of JIS-K6854.

In the present invention, the above ventilating protective sheet has substantially uniform ventilating property on the entire surface and does not give adverse effects under the production conditions mentioned below, nor cause marked deformation and degeneration by contact with a kneaded mixture containing calcium hydroxide and water, nor sustantially cause permeation of the solid content of the kneaded mixture without any limit. Specifically, the protective sheet may have a Gurley's permeability of 2000 sec./100 cc or below, especially preferably 1 to 1000 sec/100 cc, and may not have a non-ventilating portion having at least 3 mmφ, preferably at least 2 mm φ on the entire surface.

The term "sheet" in the ventilating protective sheet does not rigorously distinguish from the film by the thickness and if the sheet has a strength required as a protective sheet, there is no particular limitation in respect of the thickness.

Specific examples of the ventilating protective sheet include non-water-permeable and ventilating sheets obtained by forming micropores which only impart ventilating properties to non-water-permeable sheets such as membrane-like products and water-proof sheets such as polyethylene or polypropylene by known methods such as needle punching or stretching; fibrous sheets such as woven fabrics and non-woven fabrics composed of synthetic fibrous such as polyethylene, polypropylene, polyesters, Vinylon, polyethylene terephthalate and alkali-resistant glass.

Among the ventilating protective sheets, examples of especially preferred sheets include non-water-permeable and ventilating sheets obtained by forming micropores which impart only ventilating properties to membrane-like products such as polyethylene or polypropylene; and non-woven fabrics having ventilating properties such as polyethylene, polypropylene, polyesters, Vinylon, and polyethylene terephthalate.

By practising the method to be described below using the above ventilating protective sheets having ventilating properties, it is possible to obtain a decorative layer having a very high surface hardness.

The architectural material of the present invention as described above obtained by laminating a ventilating protective sheet with a suitable peeling strength on the surface of a decorative layer having a very special condition containing calcium hydroxide as a binder material without particularly interposing an adhesive layer separately, can be handled without peeling off of the ventilating protective sheet from the decorative layer, during the architectural material is treated. And furthermore, after the execution of the ventilating protective sheet can be peeled off easily without adversely affecting the decorative layer. In addition, the decorative layer formed by the method described below with the ventilating property of the ventilating protective sheet forms an elaborate layer of calcium carbonate on its surface whereby the surface has a surface hardness, and even after elimination of the ventilating protective sheet, the decorative layer has excellent abrasion resistance.

In the architectural material of the present invention, when particularly, the base material is a sheet, the ventilating protective sheet is laminated on the surface of the decorative layer with a moderate peeling strength, and the existence of leads to excellent bending resistance, and according to the flexibility of the sheet as a base material, the working on a two-dimensional curved surface is possible. Even when the ventilating protective sheet is removed after the execution of works, the architectural material has an excellent characteristic that a new crack does not form.

This is assumed that since the ventilating protective sheet of the present invention is adhered intimately to the entire surface of the decorative layer with a uniform peeling strength, the concentration of the bending stress generated in bending the decorative sheet at a one portion is relieved to suppress the generation of the crack.

According to the confirmation of the present inventors, the application to the curved surface was possible until the thickness of the sheet of the base material, the decorative layer (not containing fibers) of the ventilating protective sheet is 0.6 mm, 0.5 mm or 0.2 mm, and the radius of curvature of a decorative sheet was 5 mm.

The sheet of the present invention can be applied also by coating an adhesive agent on a surface to be applied, but the formation of an adhesive agent composed of a known material on the back surface of the decorative sheet is a preferred embodiment.

The method of producing the architectual material of the present invention is not particularly limited, but a preferred method is, for example, the following method.

It is a method of producing an architectural material comprising successively laminating a layer composed of a kneaded mixture of calcium hydroxide and water and the ventilating protective sheet on the surface of a base material such as the board or sheet, and when the layer composed of the kneaded mixture is covered with the ventilating protective sheet, carbonating calcium hydroxide in the kneaded mixture to cure it.

In the above method, examples of calcium hydroxide include materials containing calcium hydroxide as a main component such as industrial slaked lime, stucco and dolomite stucco as mentioned above. These materials are used without any limitation.

The above additives are added to the kneaded mixture containing calcium hydroxide and water so that as required, the above-mentioned preferred proportions mentioned above may be attained.

Various compounding agents may be added to the above kneaded mixture to improve the workability during the production of the architectural material in addition to these additives. Examples of such compounding agents include viscosity-increasing agents, fluidizing agents and defoamers.

The viscosity-increasing agents include cellulose-type compounds such as hydroxyethyl cellulose and hydroxypropylmethyl cellulose; polysaccharides such as sacchrose and glucose; and acrylic type compounds.

The fluidizing agents include a methylol/melamine condensation product, polycarboxylic acid salts, a melaminesulfonic acid/formaldehyde condensation product, a naphthalenesulfonic acid/formaldehyde condensation product and compounds containing high-molecular-weight ligninsulfonic acid as a main component.

The defoamers include, for example, Pluronic-type compounds and polyoxyethylene alkyl phenyl ether.

The amounts of these compounding agents are not particularly limited, but generally, these compounding agents may be used in the following ranges by weight % based on the kneaded mixture containing calcium hydroxide and water.

For example, the amount of the viscosity-increasing agent differs according to the properties of the viscosity-increasing agent used, but the hydroxyethyl cellulose which has a viscosity at 20° C. of 100 cP in a 1% by weight aqueous solution may be used in an amount within 0.04% by weight without raising any particular problem.

The amount of the fluidizing agent differs according to the properties of the fluidizing agent, and for example, when the fluidizing agent contains a polycarboxylic acid having excellent separation resistance as a main component, its amount may be adjusted to 0.1 to 5% by weight, preferably 0.5 to 3% by weight.

The amount of the defoamer may be within 1% by weight, preferably within 0.3% by weight.

A kneaded mixture containing calcium hydroxide and water may be obtained by adding the above-mentioned arbitrary tomptnent as required. The mixing ratio between calcium hydroxide and water is not particularly limited, but the amount of water is properly adjusted to obtain the kneaded mixture having a viscosity of 100 to 40000 centipoises whereby handling of the kneaded mixture becomes easy during the production. To obtain such a viscosity, the water content of the kneaded mixture may be mixed generally in a range of 20 to 50% by weight.

As a method of molding the kneaded mixture containing calcium hydroxide and water in a layer-like state, a method which comprises coating the kneaded mixture on a board by a roll coater, a flow coater, a knife coater, a comma coater, a spay, dipping, extrusion, or transfer on a molded material, if required, molding the coating by shaping with a trowel, shaping with a gate, shaping with a roller, or a monoaxial press may be employed without any limitation.

As a method of covering the surface of the layer of the kneaded mixture containing calcium hydroxide and water with the ventilating protective sheet, a method of adhering the sheet intimately before curing after the molding of the layer, and a method of adhering the ventilating protective sheet intimately simultaneously with the formation of the layer may be used.

The curing of the kneaded mixture containing calcium hydroxide and water in the above state is carried out by reacting the kneaded mixture containing calcium hydroxide and water with carbon dioxide in the air to form calcium carbonate. Hence, the method of curing may be carried out under conditions which do not hamper the carbonating reaction, but the aging time can be shortened by controlling the temperature, the humidity, and the concentration of carbon dioxide. As regards the aging temperature mentioned above, aging at an initial temperature of 25 to 90° C., preferably 35 to 80° C., for 30 to 120 minutes can lead to an increase in productivity.

At the time of curing, the removal of the excess water from the molded product of the kneaded mixture and the supply of carbon dioxide are important, but as described above, the use of the ventilating protective sheet is effective for evaporation of water to the open air from the molten product of the kneaded mixture via the sheet and the feeding of carbon dioxide from the open air. Not only this shortens the aging time, but also the action of the ventilating protective sheet increases the surface hardness of the decorative layer obtained.

With respect to the method of the present invention, as a method of forming a decorative layer composed of calcium carbonate on the surface of the base material, when there is used the conventional method comprising molding the kneaded mixture containing calcium hydroxide and water on the surface of the board, and thereafter curing the surface in a condition released to the atmosphere. As a result, pores are formed by the evaporation of water on the surface, and a cured product of calcium carbonate having an elaborate surface and high surface hardness cannot be obtained. Furthermore, a calcium ion in the water moved to the surface at the time of evaporation reacts with carbon dioxide in the open air to form a decorative layer which becomes brittle and shabby powder-coated condition. Furthermore, the resulting decorative layer hampers the design of the obtained architectural material, and the powder may be added to the skin and garments adhered in contact. Furthermore, there is a defect that cracks are liable to be formed by dry shrinking. In addition, when the kneaded mixture is molded under an elevated pressure, and dehydrated, the surface hardness increases with an increase in the density of the calcium carbonate cured product. This is costly, and it is difficult to remove the brittle and shabby powder-coated condition.

In contrast, because according to the producing method of the present invention, the decorative layer is cured and formed in a condition in which the surface of the molded product of the kneaded mixture containing calcium hydroxide and water is covered with the ventilating protective sheet, an abrupt volatilization of water from the surface covered with the ventilating protective sheet of the molded product is suppressed in the step of aging, it is assumed that the decorative layer in the brittle and powder-coated condition is not formed, and the method produces a decorative layer which is brittle and has a high surface hardness.

Since the surface of the decorative layer containing calcium carbonate as a binder component in this invention becomes a shape obtained by reversing and copying convex and concave designs of a surface in contact with the surface of the ventilating protective sheet, the convex and concave designs can be imparted to an architectural material obtained by applying any desired convex and concave processings in advance to a surface which contacts the above surface of the sheet. For example, if a reversed type of a plasterer-finished texture is applied to the ventilating protective sheet, a decorative layer having a surface on which the above texture is copied can be obtained. Such convex and concave processings can be practised to about ±1 mm when, for example, the decorative layer has a thickness of 2 mm.

In the method of the present invention, the peeling strength between the decorative layer and the ventilating protective layer of the architectural material can be adjusted properly under various conditions. Effective conditions are that the hydrophilic property or coarseness of a surface contacting the decorative layer of the ventilating protective sheet and additives such as an aqueous emulsion and silicone oil to be added to the kneaded mixture are controlled.

For example, by strengthening the hydrophilic property of a surface contacting the decorative layer of the ventilating protective sheet, the peeling strength is increased, and conversely, by weakening the hydrophlic property, the peeling strength is decreased. Furthermore, by increasing the amount added of the aqueous emulsion, the peeling strength is increased, and conversely, by decreasing the amount added of the aqueous emulsion, the peeling strength is lowered. Furthermore, by decreasing the amount added of the silicone oil, the peeling strength is increased, and conversely, by increasing the amount added of the silicone oil, the peeling strength is lowered.

A preferred apparatus for continuously producing the architectural material of the present invention will be explained when a board is used as a base material. When a sheet is used as the base material, an apparatus applied correspondingly may be used.

An example of the apparatus is an apparatus in which a ventilating protective sheet on which a layer of a kneaded mixture containing calcium hydroxide and water is formed in advance is continuously fed so that the layer of the kneaded mixture contacts the surface of a board transferred continuously, and a laminated body is formed by successively laminating the layer composed of the kneaded mixture and the ventilating protective sheet on the surface of the board.

Specifically, the apparatus comprising continuously feeding means for continuously feeding a ventilating protective sheet, spreading means for continuously spreading the kneaded mixture on the surface of the ventilating protective sheet to form a layer of the kneaded mixture on the surface of the ventilating protective sleet,*board transferring means for continuously feeding the board, and laminating means for laminating the layer of the kneaded mixture on the board to which the ventilating protective sheet having the layer of the kneaded mixture has bee supplied so that the layer of the kneaded mixture may contact the board.

Means for cutting the ventilating protective sheet existing astride a joint between a board and a board can be added as required.

FIG. 3 is a rough view showing a typical embodiment of the above apparatus.

Such an apparatus comprises continuous feeding means of a ventilating protective sheet constituted by a ventilating protective sheet wind-up roll 5 for feeding the ventilating protective sheet 3 continuously; spreading means constituted by two rolls 6 and 7 opposed to each other with a gap therebetween, each roll surface forming a dam of a kneaded mixture 4 containing calcium hydroxide and water, while the ventilating protective sheet 3 which is fed continuously is contacting one roll 6 (to be referred to as a ventilating protective sheet supporting roll), and the ventilating protective sheet 3 is passed through the gap with respect to the other roll 7 (to be referred to as the spreading roll) whereby the kneaded mixture may be spread on the surface of the ventilating protective sheet in a fixed thickness, board conveying means constituted by a conveyor for transferring the base material (board) 1 continuously; in a conveying passage of the board transferring means, the ventilating protective sheet supporting roll 6 and the board supporting toll 8 with a gap therebetween are provided to support the board; laminating means constructed so that the layer of the kneaded mixture may contact the board.

A transferring function for the board may be added to the above board supporting roll 8, and a board-supporting function may be given to the conveyor 9.

Furthermore, when the ventilating protective sheet 3 is a resin ventilating protective sheet, it is a preferred embodiment that a residual stress possessed by the ventilating protective sheet should be removed by providing a heating device 10 such as an infrared heater and a hot air heater.

Furthermore, as means for feeding the ventilating protective sheet 3 to the ventilating protective sheet supporting roll 6 without sluggishness, it is a preferred embodiment to provide a powder brake in a ventilating protective sheet supporting roll 5 which can be torque-controllable and also to provide a pair of pinch rollers 11 on both sides immediately before the ventilating protective sheet supporting roll 6.

The architectural material of the present invention has a decorative layer containing calcium carbonate as a binder component on the surface of a base material such as a board or a sheet and contains a structure in which a ventilating protective sheet is laminated on its surface with a moderate peeling strength. Accordingly, until the application of the protective sheet is terminated, the ventilating protective sheet is not peeled off, and contamination and damaging of the decorative layer can be prevented. In addition, after the application of the protective sheet, the decorative layer and the ventilating protective sheet can be easily peeled off at the interface of both layers.

Since the decorative layer of the present invention can be formed by covering the surface of the molded product of the kneaded mixture containing calcium hydroxide and water with the ventilating protective sheet and is cured and formed in this condition, the abrupt evaporation of the water from the surface covered with the ventilating protective sheet of the molded product during the aging step can be suppressed, the brittle powder-coated calcium carbide layer does not form, and an elaborate decorative layer having a high surface hardness can be obtained whereby the decorative layer acts to function as the ventilating protective sheet and can prevent the damage and contamination of the surface very effectively.

Furthermore, when the base material is a sheet, a similar decorative layer as in the present invention is provided, and the ventilating protective sheet exists on the surface of the decorative layer whereby the occurrence of cracks of the decorative layer due to bending of the sheet is markedly decreased, and the decorative layer has excellent handling properties.

Accordingly, the architectual material in which the base material is a sheet has an equivalent flexibility to a conventional wall paper in a condition in which the ventilating protective sheet is intimately adhered, and when the ventilating protective sheet is torn off after the execution of works, a surface of the decorative layer having a plasterer-finished design and excellent flame retarding properties appears to show surfaces of a wall surface, a pillar surface or a ceiling surface.

The architectural material of the present invention can be handled in the same way as known boards if the base material is a board, and by the same working method as known boards, a wall surface, a pillar surface and a ceiling surface having a plasterer-finished design can be easily obtained. Thus, these architectual materials are easy to handle because until the termination of the execution of works, the materials are difficult to receive contamination, and furthermore, these materials are difficult to be subjected to injuries after the execution of works.

Furthermore, since in the architectural material of the present invention, the decorative layer has hygroscopicity and releasability of humidity, dew condensation occurs difficultly. When a ventilating board is used as the base material, the decorative layer exhibits equivalent or higher hygroscopicity and releasability of humidity to or than the case of using the ventilating board alone.

In this way, the architectural material of the present invention is preferred as an interior finishing work and an outer finishing work. It is a material which meets the demand of the dry processability and simplification of the plasterer's finishing work. When these materials are used in interior finishing works, they also exhibit a function of adjusting the humidity environments of an indoor space.

Examples and Comparative Examples will be shown below in order to illustrate the present invention more specifically.

The thickness of a decorative layer containing calcium carbonate as a binder component in the samples was adjusted to about 1 mm.

(1) Carbonization Ratio

Calcium hydroxide and calcium carbonate in the decorative layer were quantitatively determined by an ignition loss method, and the change ratio of calcium hydroxide to calcium carbonate was calculated.

(2) Peeling Strength

In accordance with a 180° peeling adhesion strength test of JIS-K6854, a sample having a width of 25 mm was measured under a measuring condition of 300 mm/minute.

(3) Surface Hardness Test

The surface hardness was measured by a pencil hardness method of JIS-K5400.

(4) Contact Soiling Test

The surface of the sample was rubbed with a black towel material. An adhering matter was observed with an eye. The results were evaluated by ○ which showed that the adhering matter was hardly observed and X which showed that the results were otherwise.

(5) Flexibility

The sample was pasted on a cylinder having a diameter of 50 mm, and the flexibility was evaluated by ○ which showed that cracks were not formed in the decorative layer, and X which showed that the cracks were formed in the decorative layer.

(A) Base Material

Board

Gypsum board: GB-R 300×300×9.5 mm

Calcium silicate plate: Calcium silicate board 300×300×10 mm

Flexible plate: Asbestos cement calcium silicate board 300×300×6 mm

Sheet

Waterproofing paper: Base paper for a gypsum board

RG00: "RG00" (tradename; a non-woven cloth containing a resin sheet)

Titanium paper: titanium paper made by Kojin Co., Ltd. (basis weight: 80 g/m$^2$)

(B) Calcium Hydroxide

Slaked lime A: "For Yukizirushi Plasterer" (tradename) manufactured by Tanaka Lime Co., Ltd. (having an average particle diameter of 7 μm)

Slaked lime B: JIS R 9001-81 standard product (an average particle diameter of 3 μm)

Slaked lime C: "Kentoku K100" (tradename) manufactured by Yoshizawa Lime Industrial Co., Ltd. (an average particle diameter of 10 μm)

Dolomite stucco: manufactured by Nippon stucco Co., Ltd. "For top coating" (tradename) (an average particle diameter of 10 μm (C) Aqueous Emulsion Mowinyl: "MOWINYL 752" (tradename) manufactured by Hoechst Synthetic Co., Ltd. (Acrylic styrene copolymer, solid content 47% by weight)

Keepsion: "KEEPSION K-100" (tradename) (vinyl acetate type; solid content 45% by weight) manufactured by Tokuyama Corporation Polytlon: "POLYTLON A1450T" (tradename) manufactured by Asahi Chemical Industry Co., Ltd. (Acrylic-type copolymer latex, solid content 45% by weight)

(D) Fibers

VPB103: "VPB103×2" (tradename) manufactured by Kurare Inc. (Vinylon fiber, 10 μm φ×2 mm)

RBW203: "RBW203×4" (tradename) manufactured by Kurare Inc. (Vinylon fiber, 15μm φ×4 mm)

(E) Inorganic Fine Aggregate

Iical: "Iical 100" (tradename) manufactured by Iida Industrial Co., Ltd. (calcium carbonate, an average particle diameter of 40 μm)

Silica sand: Kaho (sand) No. 7 (an average particle diameter of 120 μm)

Mica: "Phlogopite S-20" (tradename) manufactured by REPCO LTD. (an average particle diameter of 700 μm)

(F) Silicone Oils

BY16-601: manufactured by Toray.Dow Corning Silicone Co., Ltd. The "BY16-601" is a tradename.

(G) Fluidizing Agent

Rheobuild: "RHEOBUILD SP-8N" (tradename) manufactured by Pozzolith Bussan Co., Ltd.

Sikament: "Sikament 1000NT" (tradename) manufactured by Sika Japan Ltd.

(H) Defoamer

SN 260: "SN Defoamer 260" (tradename)

(I) Pigment manufactured by SANNOPCO Ltd.

Iron oxide: "Bayf errox 610" (tradename) manufactured by Bayer Co., Ltd.

(J) Ventilating Protective Sheet

Porum PH: "PORUM PH" (tradename) manufactured by Tokuyama Corporation

Polam PN: "Polam PN" (tradename) manufactured by Tokuyama Corporation

NF sheet: "NF sheet NG" (tradename) manufactured by Tokuyama Corporation

NF sheet C: "NF sheet NG" (tradename) manufactured by Tokuyama Corporation was subjected to a surface hydrophilic processing by corona discharging.

Non-woven fabric A: "MARIX 20704FLD" (tradename) manufactured by Unitika Limited.

Non-woven fabric B: "Tyvek 1059B" (tradename) manufactured by Asahi. DuPont Flash-Spun Product Co., Ltd.

The Gurley's permeabilities of the above ventilating protective sheets are shown in Table 2. The ventilating protective sheet was such that microporous holes existed in the entire surface of the sheet uniformly, and in the entire surface of the sheet, a non-air-permeable portion did not exist within a range of 3 mmφ.

(K) Non-Ventilating Sheet

Tacky tape: Kraft tape manufactured by Nichiban Co., Ltd.

Commercially available polyethylene sheet (thickness of 50 μm)

EXAMPLES 1 to 11

A kneaded mixture obtained by kneading the starting materials of the types in the compounding ratios shown in Table 1 was coated on the surface of the board shown in Table 1 so that the thickness of the kneaded mixture after being cured is 1 mm, and the surface was covered with the ventilating protective sheet shown in Table 2. In this condition, the resulting product was molded and aged under the conditions shown in Table 2, and the kneaded mixture was cured to form a decorativer layer containing calcium carbonate as a binder component.

The resulting architectural material was allowed to stand under such conditions of a temperature of 25° C. and a humidity of 65% to adjust the change ratio (carbonation ratio) of calcium hydroxide to calcium carbonate to at least 75%, and then the architectural material was used in the test. The results of the test of the resulting architectural material are also shown in Table 2.

The architectural materials obtained in Examples 1 to 11 were not cut by a circular saw, and during transportation, the ventilating protective sheets were not peeled off at all. The ventilating protective sheets were peeled off smoothly without damaging the decorative layers.

COMPARATIVE EXAMPLE 1

A decorative layer was formed on the surface of the board in the same way as in Example 1 except that the ventilating protective sheet was not covered on the board (see Tables 1 and 2).

Furthermore, a commercial adhesive tape was pasted on the surface of the decorative layer to produce an architectural material having the same appearance as in the Example. The test results of the resulting architectural material are shown in Table 2.

The above architectural material was cut by a circular saw, and during the transportation, the ventilating protective sheet was peeled over a large area. As a result, the architectural material was not practical

COMPARATIVE EXAMPLE 2

A decorative layer was formed on the surface of the board in the same way as in Example 3 except that the ventilating protective layer was not covered on the board (see Tables 1 and 2).

A commercial tacky tape was pasted on the surface of the decorative layer to produce an architectural material having the same outer appearance as in the Example. The test results of the architectural material were shown in Table 2.

The above architectural material was cut by a circular saw, and during the transportation, the ventilating protective sheet was peeled over a large area. As a result, the architectural material was not practical.

TABLE 1

| | Base material/ board | Calcium hydroxide | Aqueous emulsion | Fiber | Inorganic fine aggregate | Silicone oil | Fluidizing agent | Defoamer | Water | Ventilating protective sheet |
|---|---|---|---|---|---|---|---|---|---|---|
| Ex. 1 | Gypsum board | Slaked lime A 33 | MOWINYL 9.3 | RBW 203 0.3 | Iical 24.0 | BY16-601 0.3 | Rheobuid 1.0 | SN260 0.1 | 32.0 | Porum PH |
| Ex. 2 | Gypsum board | Slaked lime A 33 | MOWINYL 9.3 | RBW 203 0.3 | Iical 24.0 | BY16-601 0.3 | Rheobuid 1.0 | SN260 0.1 | 32.0 | Porum PH |
| Ex. 3 | Gypsum board | Slaked lime A 33 | MOWINYL 9.3 | RBW 203 0.3 | Iical 24.0 | BY16-601 0.3 | Rheobuid 1.0 | SN260 0.1 | 32.0 | NF sheet |
| Ex. 4 | Calcium silicate plaster | Dolomite plaster 56 | none | RBW 203 0.4 | none | BY16-601 0.6 | none | none | 43.0 | Porum PN |
| Ex. 5 | Flexible plate | Slaked lime B 38 | Keepsion 8.3 | VPB 103 0.3 | Silica sand 20.0 | none | Rheobuid 1.3 | SN260 0.1 | 32.0 | Porum PH |
| Ex. 6 | Gypsum board | Slaked lime A 26 | none | VPB 103 0.2 | Iical 45.0 | BY16-601 0.2 | Rheobuid 1.5 | SN260 0.1 | 27.0 | Non-woven fabric A |
| Ex. 7 | Gypsum board | Slaked lime A 26 | Polytlon 10.0 | VPB 103 0.2 | Iical 45.0 | BY16-601 0.2 | Rheobuid 1.5 | SN260 0.1 | 17.0 | Non-woven fabric A |
| Ex. 8 | Gypsum board | Slaked lime A 33 | MOWINYL 9.0 | none | Iical 24.0 | BY16-601 0.9 | Sikament 1.0 | SN260 0.1 | 32.0 | NF sheet |
| Ex. 9 | Gypsum board | Slaked lime A 40 | Polytlon 10.0 | none | Mica 13.4 | BY16-601 0.3 | Sikament 1.3 | none | 35.0 | Non-woven fabric B |
| Ex. 10 | Gypsum board | Slaked lime A 40 | Polytlon 10.0 | none | Mica 17.8 | BY16-601 0.9 | Sikament 1.3 | none | 30.0 | NF sheet |
| Ex. 11 | Gypsum board | Slaked lime A 40 | Polytlon 10.0 | none | Mica 17.8 | BY16-601 0.9 | Sikament 1.3 | none | 30.0 | NF sheet |
| Comp. Ex. 1 | Gypsum board | Slaked lime A 33 | MOWINYL 9.3 | RBW 203 0.3 | Iical 24.0 | BY16-601 0.3 | Rheobuid 1.0 | SN260 0.1 | 32.0 | none*1 |
| Comp. Ex. 2 | Gypsum board | Slaked lime A 33 | MOWINYL 9.3 | RBW 203 0.3 | Iical 24.0 | BY16-601 0.3 | Rheobuid 1.0 | SN260 0.1 | 32.0 | none*1 |

*1: A tacky tape was pasted to the surface of the decorative layer to prepare a test sample for measuring peeling strength.

TABLE 2

| | Ventilating protective sheet | Gurley's permeability (sec./100 cc) | Pressurization dehydration *3 | Curing conditions | | | Carbonation ratio (%) | Peeling strength (Mn) | Surface hardness | Contact soiling resistance |
|---|---|---|---|---|---|---|---|---|---|---|
| | | | | Temp. (° C.) | Relative humidity (%) | Time (min.) | | | | |
| Ex. 1 | Porum PH | 200 | — | 50 | 13 | 40 | 81 | 1820 | B | ○ |
| Ex. 2 | Porum PH | 200 | — | 35 | 55 | 90 | 83 | 2250 | B | ○ |
| Ex. 3 | NF sheet | 50 | yes | 50 | 13 | 40 | 80 | 2180 | HB | ○ |
| Ex. 4 | Porum PN | 800 | — | 50 | 13 | 40 | 80 | 970 | B | ○ |
| Ex. 5 | Porum PH | 200 | — | 50 | 13 | 40 | 81 | 1420 | H | ○ |
| Ex. 6 | Non-woven | 4 | — | 35 | 55 | 60 | 84 | 1170 | HB | ○ |

TABLE 2-continued

|  | Ventilating protective sheet | Gurley's permeability (sec./100 cc) | Pressurization dehydration *3 | Curing conditions | | | Carbonation ratio (%) | Peeling strength (Mn) | Surface hardness | Contact soiling resistance |
| --- | --- | --- | --- | --- | --- | --- | --- | --- | --- | --- |
|  |  |  |  | Temp. (° C.) | Relative humidity (%) | Time (min.) |  |  |  |  |
| Ex. 7 | fabric A Non-woven fabric A | 4 | — | 35 | 55 | 60 | 82 | 2090 | HB | ○ |
| Ex. 8 | NF sheet C | 50 | yes | 50 | 13 | 40 | 78 | 1800 | HB | ○ |
| Ex. 9 | Non-woven fabric B | 200 | — | 35 | 55 | 60 | 76 | 1600 | B | ○ |
| Ex. 10 | NF sheet | 50 | — | 50 | 13 | 40 | 85 | 1050 | B | ○ |
| Ex. 11 | NF sheet C | 50 | — | 50 | 13 | 40 | 82 | 2200 | B | ○ |
| Co. Ex. 1 | none *1 | — | — | 50 | 13 | 40 | 81 | 70 *2 | 4B | X |
| Co. Ex. 2 | none *1 | — | yes | 50 | 13 | 40 | 84 | 100 *2 | 2B | X |

*1: A tacky tape was pasted to the surface of the decorative layer to prepare a test sample to show a peeling strength.
*2: Irregularly peeled.
*3: Pressurized, dehydrated and molded for 3 minutes at a pressure of 0.5 MPa by a monoaxial pressing apparatus.

EXAMPLES 12 to 16

A kneaded mixture obtained by kneading the starting materials of the types and compounding ratios shown in Table 3 was laminated between a base sheet and the ventilating protective sheet shown in Table 4, and the above-treated material was molded and aged under the conditions shown in Table 4. Furthermore, the product was allowed to stand under conditions including a temperature of 25° C. and a relative humidity of 65% to adjust the change ratio (carbonation ratio) of calcium hydroxide to calcium carbonate to more than 75% to give a sample for measurement. The test results of the resulting samples are shown in Table 4.

In Examples 15 and 16, a decorative layer was formed on the side of the non-woven fabric of the base material sheet.

COMPARATIVE EXAMPLE 3

A sample was prepared in the same way as in Example 12 except that the covering by a sheet was not performed. Furthermore, a tacky tape was pasted to the sample to prepare a sample for measuring the peeling strength. The test results of the sample are shown in Table 4.

TABLE 3

| | Compounding of the components of the kneaded mixture (weight %) | | | | | | | | | | |
| --- | --- | --- | --- | --- | --- | --- | --- | --- | --- | --- | --- |
|  | Calcium hydroxide | Inorganic fine aggregate | Aqueous emulsion | Fiber | Pigment | Silicone oil | Fluidizing agent | Defoamer | Water | Base sheet | Ventilating protective sheet |
| Ex. 12 | Slaked lime A 36.0 | Iical 30.0 | MOWINYL 11.8 | RBW 203 1.2 | Iron oxide 0.1 | BY16-601 0.4 | Rheobuid 0.8 | SN 260 0.1 | 19.6 | Water-proofing sheet | Porum PH |
| Ex. 13 | Slaked lime A 55.0 | Iical 10.0 | MOWINYL 10.0 | RBW 203 2.0 | none | none | none | none | 23.0 | Water-proofing sheet | Porum PH |
| Ex. 14 | Slaked lime A 40.0 | silica sand 26.0 | MOWINYL 9.8 | RBW 203 1.2 | none | BY16-601 0.5 | Rheobuid 0.5 | SN 260 0.1 | 21.9 | Water-proofing sheet | NF sheet |
| Ex. 15 | Slaked lime A 68.0 | none | Keepsion 10.0 | RBW 203 1.5 | Iron oxide 0.1 | BY16-601 0.5 | Sikament 2.0 | none | 17.9 | RG00 | NF sheet |
| Ex. 16 | Slaked lime C 50.0 | Iical 20.0 | MOVINYL 10.0 | RBW 203 1.5 | Iron oxide 0.1 | BY16-601 0.4 | Rheobuid 0.8 | none | 17.2 | RG00 | NF sheet |
| Comp. Ex. 3 | Slaked lime A 36.0 | Iical 30.0 | MOVINYL 11.8 | RBW 203 1.2 | Iron oxide 0.1 | BY16-601 0.4 | Rheobuid 0.8 | SN 260 0.1 | 19.6 | Water-proofing sheet | none *1 |

*1: A sample for measuring the peeling strength was prepared by pasting a tacky tape to the surface of the decorative layer.

TABLE 4

| | Curing condition | | | | Carbon- | | | | | |
|---|---|---|---|---|---|---|---|---|---|---|
| | Pressurization | Temp. (° C.) | Relative humidity (%) | Time (min.) | Peeling strength (mN) | ation ratio (%) | Flexibility | Contact soiling test | Soiling resistance | Surface hardness |
| Ex. 12 | — | 35 | 55 | 20 | 1890 | 82 | ○ | ○ | ○ | HB |
| Ex. 13 | — | 35 | 55 | 20 | 2010 | 80 | ○ | ○ | ○ | B |
| Ex. 14 | yes*3 | 80 | 10 | 10 | 2420 | 82 | ○ | ○ | ○ | H |
| Ex. 15 | — | 50 | 13 | 15 | 2200 | 79 | ○ | ○ | ○ | B |
| Ex. 16 | — | 50 | 13 | 15 | 2150 | 82 | ○ | ○ | ○ | B |
| Comp. Ex. 3 | — | 35 | 55 | 20 | 110 *1 | 84 | X | X | X | 4B |

*1: A sample for measuring the peeling strength was prepared by pasting a tacky tape to the surface of the decorative layer.
*3: Pressurized, dehydrated and molded for 3 minutes at a pressure of 0.5 MPa by a monoaxial pressing apparatus.

EXAMPLES 17 to 21

A kneaded mixture obtained by kneading the starting materials of the types and compounding ratios shown in Table 5 was coated on the surface of the ventilating protective sheet of the type shown in Table 6 by a roll coater method, was immediately adhered intimately and laminated on the sheet of the type shown in Table 6, and heated in a desiccator at a temperature of 40° C. for 5 minutes, and further was allowed to stand under conditions at a temperature of 25° C. and a relative humidity of 65% to prepare a test sample in which the change ratio (carbonization ratio) of calcium hydroxide to calcium carbonate exceeded 75%. The thickness of the decorative layer in the test sample and the composition (theoretical value) of the decorative layer at the above change ratio of 100% are shown in Table 6, and the test results are shown in Table 7.

COMPARATIVE EXAMPLE 4

A kneaded mixture obtained in the same way as in Table 17 was coated on the surface of a sheet of the type shown in Table 6, thereafter without laminating the ventilating protective sheet, the coated sheet was heated in a desiccator at a temperature of 40° C. for 5 minutes, and was allowed to stand under conditions at a temperature of 25° C. and a relative humidity of 65% to prepare a test sample in which the change ratio (carbonization ratio) of calcium hydroxide to calcium carbonate exceeded 75%. Furthermore, a tacky tape was pasted on the above test sample to form a peeling strength test sample.

The thickness of the decorative layeer of the resulting test sample and the composition (theoretical value) of the decorative layer at the above change ratio of 100% are shown in Table 6, and the test results are shown in Table 7.

TABLE 5

| | Compounding of the components of the kneaded mixture (weight %) | | | | | | | |
|---|---|---|---|---|---|---|---|---|
| | Calcium hydroxide | Inorganic fine aggregate | Aqueous emulsion | Pigment | Silicone oil | Fluidizing agent | Defoamer | Water |
| Ex. 17 | Slaked lime A 42.8 | silica sand 28.6 | Polytlon 8.6 | Iron oxide 0.1 | BY16-601 0.4 | Rheobuid 0.9 | SN 260 0.1 | 18.6 |
| Ex. 18 | Slaked lime A 27.2 | silica sand 45.3 | MOWINYL 9.1 | Iron oxide 0.1 | none | none | SN 260 0.1 | 18.2 |
| Ex. 19 | Slaked lime A 48.6 | Iical 16.2 | MOWINYL 9.7 | none | BY16-601 0.5 | Rheobuid 0.5 | SN 260 0.2 | 24.3 |
| Ex. 20 | Slaked lime A 40.8 | Iical 27.2 | Polytlon 8.2 | none | BY16-601 0.4 | Sikament 1.1 | none | 22.4 |
| Ex. 21 | Slaked lime C 65.2 | none | MOWINYL 8.7 | Iron oxide 0.1 | BY16-601 0.4 | Rheobuid 1.7 | none | 23.9 |
| Comp. Ex. 4 | Slaked lime A 42.8 | silica sand 28.6 | Polytlon 8.6 | Iron oxide 0.1 | BY16-601 0.4 | Rheobuid 0.9 | SN 260 0.1 | 18.6 |

TABLE 6

| | Compounding of the components of the kneaded mixture (parts by weight) | | | | | Thickness of decorative layer (mm) | Base sheet | Protective sheet |
|---|---|---|---|---|---|---|---|---|
| | Calcium hydroxide | Inorganic fine aggregate | Solid of aqueous emulsion | Pigment | Silicone oil | | | |
| Ex. 17 | 67.0 | 33.0 | 4.5 | 0.1 | 0.5 | 0.6 | Waterproofing sheet | NF sheet |
| Ex. 18 | 44.8 | 55.2 | 5.2 | 0 | 0 | 0.3 | Waterproofing sheet | NF sheet |
| Ex. 19 | 80.2 | 19.8 | 5.6 | 0 | 0.6 | 0.6 | Waterproofing sheet | Porum |
| Ex. 20 | 67.0 | 33.0 | 4.5 | 0 | 0.5 | 0.6 | Titanium paper *1 | Porum |
| Ex. 21 | 100 | 0 | 4.6 | 0.1 | 0.5 | 0.5 | Titanium paper *1 | Porum |
| Comp. Ex. 4 | 67.0 | 33.0 | 4.5 | 0.1 | 0.5 | 0.6 | Waterproofing sheet | none |

*1: A paper containing a titania as a filler

TABLE 7

| | Carbonation ratio (%) | Peeling strength (mN) | Flexibility | Contact soiling test | Soiling resistance | Surface hardness |
|---|---|---|---|---|---|---|
| Ex. 17 | 87 | 1770 | ○ | ○ | ○ | HB |
| Ex. 18 | 85 | 1890 | ○ | ○ | ○ | H |
| Ex. 19 | 77 | 2150 | ○ | ○ | ○ | B |
| Ex. 20 | 77 | 2220 | ○ | ○ | ○ | B |
| Ex. 21 | 80 | 2370 | ○ | ○ | ○ | B |
| Comp Ex. 4 | 88 | 100 *1 | X | X | X | 2B |

*1: A tacky tape was pasted to the surface of the decorative layer to form a test sample.

COMPARATIVE EXAMPLE 5

A decorative layer was formed on the surface of a board in the same way as in Example 1 except that in Example 1, a polyethylene sheet having a thickness of 50 μm was used as a non-ventilating sheet instead of the ventilating protective sheet.

In the resulting architectural material, a water vapor pressure was generated at the inner surface of the polyethylene sheet, and about 30% of the surface area of the polyethylene sheet was peeled off. The remaining intimately adhered portion was subjected to the same test as in Example 1. As a result, it was found that the sheet had a peeling strength of 150 mN, the decorative layer has a surface hardness of 3B, and the decorative layer had a contact soiling resistance of X.

What is claimed is:

1. An architectural material obtained by forming a decorative layer containing calcium carbonate as a binder component on the surface of a base material, and laminating a ventilating protective sheet having a peeling strength of 200 to 4000 mN on the surface of the decorative layer without interposing an adhesive layer separately.

2. An architectural material of claim 1 wherein the decorative layer is formed in situ by carbonating a kneaded mixture containing calcium hydroxide and water in a condition of having the ventilating protective sheet on the surface of the mixture.

3. An architectural material of claim 1 wherein the surface of the decorative layer has a pencil hardness of B or above.

4. An architectural material of claim 1 wherein the base material is a board or a sheet.

5. An architectural material of claim 1 wherein the binder component of the decorative layer contains an aqueous emulsion of solids content.

6. An architectural material of claim 5 wherein the solids content of the aqueous emulsion in the decorative layer is 0.5 to 18% by weight.

7. A process for producing an architectural material, which comprises successively laminating a layer composed of a kneaded mixture containing calcium hydroxide and water and a ventilating protective sheet on the surface of a base material, and in this condition, carbonating and curing the calcium hydroxide.

8. A process according to claim 7 wherein the ventilating protective sheet has a Garley permeability of 2000 sec./100 cc or below, and in a range of at least 3 mmφ over the entire surface of the sheet, a non-ventilating portion does not exist.

9. A process according to claim 7 wherein the base material is a board or a sheet.

10. A process according to claim 7 wherein the kneaded mixture contains an aqueous emulsion.

11. A process according to claim 7 wherein the kneaded mixture contains a fiber.

* * * * *